US 9,191,695 B2

(12) United States Patent
Ohmata et al.

(10) Patent No.: US 9,191,695 B2
(45) Date of Patent: Nov. 17, 2015

(54) RECEIVER, PROGRAM, AND RECEPTION METHOD

(75) Inventors: Hisayuki Ohmata, Tokyo (JP); Kazuhiro Otsuki, Tokyo (JP); Keigo Majima, Tokyo (JP); Go Ohtake, Tokyo (JP); Yuki Hironaka, Tokyo (JP); Yusuke Endo, Tokyo (JP)

(73) Assignee: NIPPON HOSO KYOKAI, Tokyo (JP)

( * ) Notice: Subject to any disclaimer, the term of this patent is extended or adjusted under 35 U.S.C. 154(b) by 0 days.

(21) Appl. No.: 14/361,009

(22) PCT Filed: Sep. 14, 2012

(86) PCT No.: PCT/JP2012/073647
§ 371 (c)(1),
(2), (4) Date: May 28, 2014

(87) PCT Pub. No.: WO2013/080631
PCT Pub. Date: Jun. 6, 2013

(65) Prior Publication Data
US 2014/0331271 A1 Nov. 6, 2014

(30) Foreign Application Priority Data
Nov. 30, 2011 (JP) ................................. 2011-262011

(51) Int. Cl.
*H04N 7/16* (2011.01)
*H04N 21/433* (2011.01)
(Continued)

(52) U.S. Cl.
CPC ............ *H04N 21/4334* (2013.01); *G06F 21/10* (2013.01); *H04H 60/14* (2013.01);
(Continued)

(58) Field of Classification Search
None
See application file for complete search history.

(56) References Cited

U.S. PATENT DOCUMENTS 7,886,332 B2 * 2/2011 Aratani et al. ................ 725/151

FOREIGN PATENT DOCUMENTS

JP    2003-264748 A    9/2003
JP    2009-503641 A    1/2009
(Continued)

OTHER PUBLICATIONS

Peter Lubbers, et al., "Chapter 3 Working with HTML5 Audio and Video", In: Pro HTML5 Programming, 2010, ISBN:978-1-4302-2790-8, p. 65-86, [online], [retrieved on Oct. 19, 2012], Retrieved from the internet: <URL:http://faculty.scf.edu/winterf/0ClassFolders/2820Web/eBook-Springer/HTML5/HTML5-LubbersCH3Audio Video.pdf.>.
(Continued)

*Primary Examiner* — Oschta Montoya
(74) *Attorney, Agent, or Firm* — Drinker Biddle & Reath LLP

(57) ABSTRACT

A receiver includes: a broadcast contents acquisition unit configured to acquire contents from a broadcast signal; a determination unit configured to determine whether a received application is an application whose reference to the contents has been permitted; a recording unit configured to record, in a first storage area, an application whose reference to the contents has been determined to have been permitted by the determination unit, and record, in a second storage area, an application whose reference to the contents has been determined not to have been permitted by the determination unit; an execution unit configured to execute the application recorded in at least one of the first storage area and the second storage area; and a reference refusal unit configured to refuse reference to the contents acquired by the broadcast contents acquisition unit due to execution of an application other than the application recorded in the first storage area.

10 Claims, 3 Drawing Sheets

(51) Int. Cl.
*H04H 60/14* (2008.01)
*H04N 21/434* (2011.01)
*H04N 21/442* (2011.01)
*H04N 21/454* (2011.01)
*G06F 21/10* (2013.01)
*H04L 29/08* (2006.01)
*H04N 21/443* (2011.01)

(52) U.S. Cl.
CPC ............ *H04L29/0809* (2013.01); *H04L 67/02* (2013.01); *H04N 21/4349* (2013.01); *H04N 21/4424* (2013.01); *H04N 21/454* (2013.01); *H04N 21/4431* (2013.01)

(56) References Cited

FOREIGN PATENT DOCUMENTS

| | | |
|---|---|---|
| JP | 2009-271914 A | 11/2009 |
| JP | 2010-148141 A | 7/2010 |
| WO | WO-2007/011177 A1 | 1/2007 |

OTHER PUBLICATIONS

International Search Report mailed Oct. 30, 2012 for PCT/JP2012/073647.

\* cited by examiner

RECEIVER, PROGRAM, AND RECEPTION METHOD

TECHNICAL FIELD

The present invention relates to a receiver, a program, and a reception method which execute an application and generate display information including the application and contents included in a broadcast signal.

Priority is claimed on Japanese Patent Application No. 2011-262011, filed Nov. 30, 2011, the content of which is incorporated herein by reference.

BACKGROUND ART

With the recent development of digital broadcasting and broadband communication, realization of broadcasting-communication integrated services, including European HbbTV (Hybrid Broadcast Broadband TV), has been studied and developed. Further, an enhanced television called a "smart television" enabling various communication services to be utilized using applications, as well as having a broadcast reception function, has begun to spread. Each user adds applications selected from an application list distributed via a portal site or the like to such an enhanced television enabling the user to use services other than the broadcast. Various communication services can be utilized when the added applications are executed by the enhanced television.

An API (Application Programming Interface) may be provided in a platform introducing applications to expand services as described above or a device constituting the platform as an interface for enabling functions of the platform or the device to be used from the applications. It is possible to simplify design and coding tasks for software for enabling the functions of the platform or the device to be handled from the application by providing such an API. Therefore, it is possible to efficiently produce applications. Such a concept has also been considered in a receiver intended for broadcasting-communication integration.

For example, a structure which easily acquires information related to broadcasts through communication and uses the information by providing an API between a data broadcasting browser and a communication function of a receiver is disclosed in Patent Document 1.

PRIOR ART DOCUMENT

Patent Document

[Patent Document 1] Japanese Unexamined Patent Application, First Publication No. 2010-148141

SUMMARY OF INVENTION

Problem to be Solved by the Invention

In Patent Document 1, a risk of data or contents processed in the receiver being fraudulently used is reduced by limiting the APIs to which access is permitted, as described above. For example, a copyright infringing application which acquires a video using an API for reading a video received by the receiver through broadcasting, copies the acquired video, and distributes the video on the Internet is prevented from being produced by limiting the access to the API.

However, for example, in applications using HTML (HyperText Markup Language), there is a problem in that the broadcast contents included in the broadcast signal can be referenced without depending on the API. For example, the broadcast contents can be referenced without depending on the API by setting a reference destination of a video tag of the HTML to the broadcast contents.

The present invention has been made in light of such circumstances and provides a receiver, a program and a reception method which are capable of controlling access to contents included in a broadcast signal without depending on an API.

Means to Solve the Problem

[1] To solve the above-described problem, a receiver of a first aspect of the present invention includes: a broadcast contents acquisition unit configured to acquire contents from a broadcast signal; a determination unit configured to determine whether a received application is an application whose reference to the contents has been permitted; a recording unit configured to record, in a first storage area, an application whose reference to the contents has been determined to have been permitted by the determination unit, and record, in a second storage area, an application whose reference to the contents has been determined not to have been permitted by the determination unit; an execution unit configured to execute the application recorded in at least one of the first storage area and the second storage area; and a reference refusal unit configured to refuse reference to the contents acquired by the broadcast contents acquisition unit due to execution of an application other than the application recorded in the first storage area.

[2] In the receiver according to the first aspect, the recording unit may store an access file accessing the contents acquired by the broadcast contents acquisition unit in the first storage area, and the reference refusal unit may be configured to refuse reference to the access file due to the execution of the application other than the application recorded in the first storage area.

[3] A program of a second aspect of the present invention for causing a computer of a receiver to function as: a broadcast contents acquisition unit configured to acquire contents from a broadcast signal; a determination unit configured to determine whether a received application is an application whose reference to the contents has been permitted; a recording unit configured to record an application whose reference to the contents has been determined to have been permitted by the determination unit in a first storage area which stores an access file accessing the contents acquired by the broadcast contents acquisition unit, and record an application whose reference to the contents has been determined not to have been permitted by the determination unit in a second storage area which does not store the access file; an execution unit configured to execute the application recorded in the first storage area or the second storage area; and a reference refusal unit configured to refuse reference to the access file due to execution of an application other than the application recorded in the first storage area.

[4] A reception method of a third aspect of the present invention includes: acquiring contents from a broadcast signal; determining whether a received application is an application whose reference to the contents has been permitted; recording, in a first storage area, an application whose reference to the contents has been determined to have been permitted, and recording, in a second storage area, an application whose reference to the contents has been determined not to have been permitted; executing the application recorded in the first storage area or the second storage area; and refusing reference to the contents due to execution of an application other than the application recorded in the first storage area.

Effect of the Invention

According to the present invention, the application is recorded in the first storage area when its reference to the contents has been permitted, and the application is recorded in the second storage area when its reference to the contents has not been permitted. Also, the reference refusal unit permits reference to the access file only for the application recorded in the first storage area. Accordingly, it is possible to control the access to the contents included in the broadcast signal without depending on the API.

EMBODIMENT FOR CARRYING OUT THE INVENTION

Hereinafter, embodiments of the present invention will be described in detail with reference to the accompanying drawings.

Figure 1:
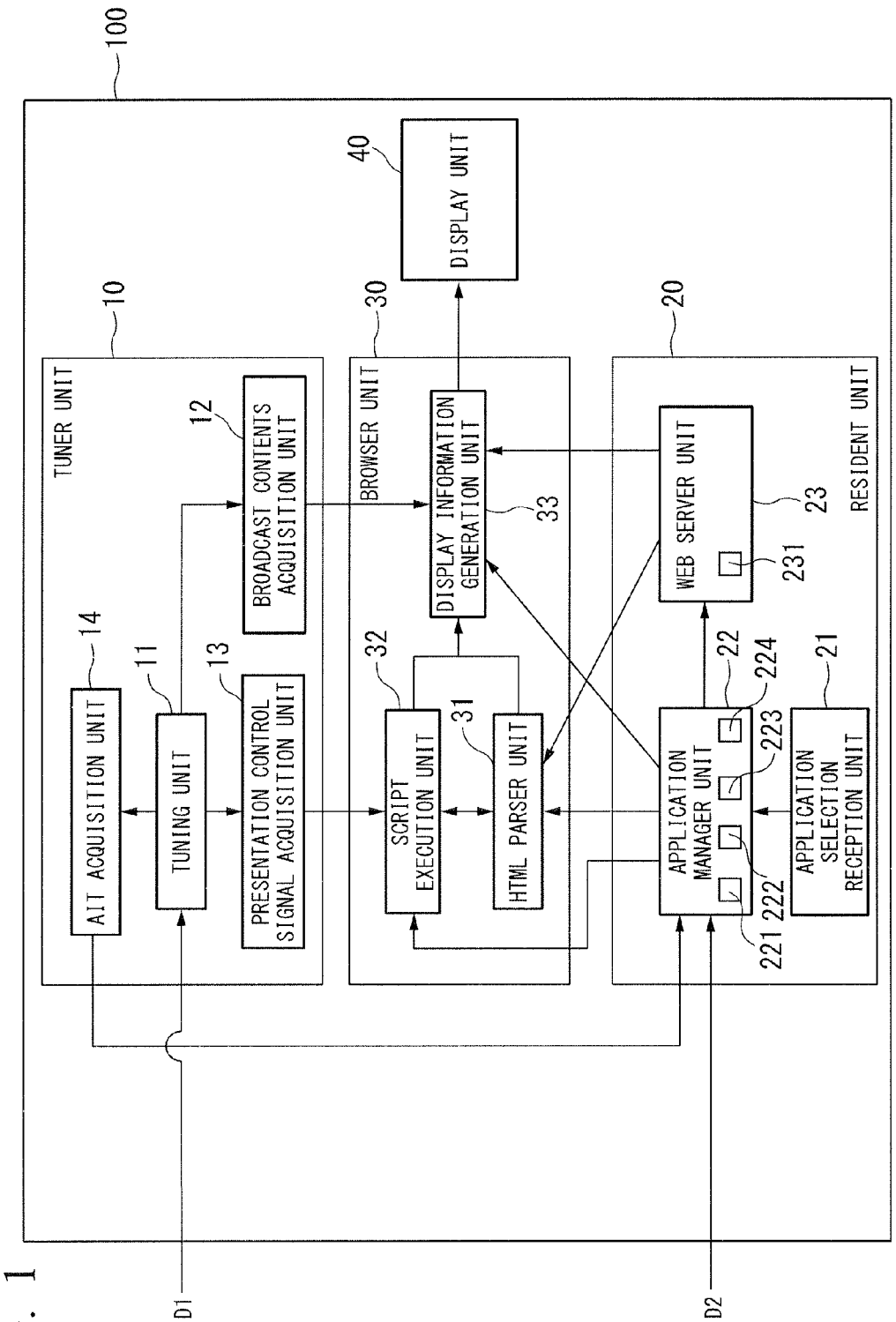
FIG. 1 is a schematic block diagram illustrating a configuration of a receiver according to one embodiment of the present invention.

FIG. 1 is a schematic block diagram illustrating a configuration of a receiver 100 according to one embodiment of the present invention.

The receiver 100 according to this embodiment displays broadcast contents included in a broadcast signal received from a broadcast transmission device and an application received from an application server. Further, the application executed by the receiver 100 in this embodiment is an HTML (HyperText Markup Language) document in which an operation is described using a script such as javascript (registered trademark).

The receiver 100 includes a tuner unit 10, a resident unit 20, a browser unit 30, and a display unit 40.

The tuner unit 10 is a processing unit which processes the broadcast signal, and includes a tuning unit 11, a broadcast contents acquisition unit 12, a presentation control signal acquisition unit 13, and an AIT acquisition unit 14.

The tuning unit 11 selects a broadcast signal D1 of one channel from the broadcast signal transmitted by the broadcast transmission device and receives the broadcast signal D1.

The broadcast contents acquisition unit 12 acquires broadcast contents from a stream included in the broadcast signal received by the tuning unit 11.

The presentation control signal acquisition unit 13 acquires a presentation control signal from the stream included in the broadcast signal received by the tuning unit 11. Further, in this embodiment, the presentation control signal is a signal for controlling an application presentation method, and is multiplexed with, for example, a PMT (Program Map Table), an EIT (Event Information Table), an SDT (Service Description Table) or the like. Further, even when an EWS (Early Warning Systems) or an EEW (Earthquake Early Warning) is transmitted, a value of data of an emergency warning broadcasting start-up flag of TMCC (Transmission and Multiplexing Configuration and Control), an earthquake vibration warning information start flag of an AC (Auxiliary Channel) or a subtitle packet is parsed to recognize generation of an event, and a value of the presentation control signal is associated with the event. Further, the presentation control signal indicates a policy level indicating a step of the application presentation method.

The AIT acquisition unit 14 acquires an AIT (Application Information Table) included in the broadcast signal received by the tuning unit 11. When an application start-up instruction or an application stop instruction is included, the AIT acquisition unit 14 outputs the instruction to the resident unit 20.

The resident unit 20 is a processing unit which manages the application, and includes an application selection reception unit 21, an application manager unit 22, and a web server unit 23.

The application manager unit 22 includes a determination unit 221, a recording unit 222, a reference refusal unit 223, and a first storage area 224. The web server unit 23 includes a second storage area 231.

The application selection reception unit 21 receives a selection of the application via a remote controller through a manipulation of a user, and outputs an application start-up instruction or an application stop instruction to the application manager unit 22.

When the application manager unit 22 receives the application start-up instruction from the AIT acquisition unit 14 or the application selection reception unit 21, the application manager unit 22 receives the application D2 from the application server. Also, when the application is an application subjected to predetermined authentication (hereinafter referred to as application A), the application manager unit 22 records the application in the first storage area 224 of the application manager unit 22. On the other hand, when the application is an application not subjected to predetermined authentication (hereinafter referred to as application B), the application manager unit 22 records the application in the second storage area 231 of the web server unit 23. Further, in this embodiment, application A is an application which is not a target of screen presentation control by the presentation control signal and is an application whose reference to the broadcast contents has been permitted. On the other hand, application B is an application which is a target of screen presentation control by the presentation control signal and is an application whose reference to the broadcast contents has not been permitted.

Specifically, the determination unit 221 determines whether an application D2 received from the application server is an application whose reference to the contents has been permitted.

Further, the recording unit 222 records, in the first storage area 224, the application whose reference to the contents has been determined to have been permitted by the determination unit 221, and records, in the second storage area 231, the application whose reference to the contents has been determined not to have been permitted by the determination unit 221. Further, the recording unit 222 stores, in the first storage area 224, an access file accessing the contents acquired by the tuning unit 11.

The reference refusal unit 223 refuses reference to the contents acquired by the tuning unit 11 due to execution of an application other than the application recorded in the first storage area 224. Further, the reference refusal unit 223 refuses reference to the access file due to the execution of the application other than the application recorded in the first storage area 224.

The web server unit 23 stores application B received by the application manager unit 22.

Figure 2:
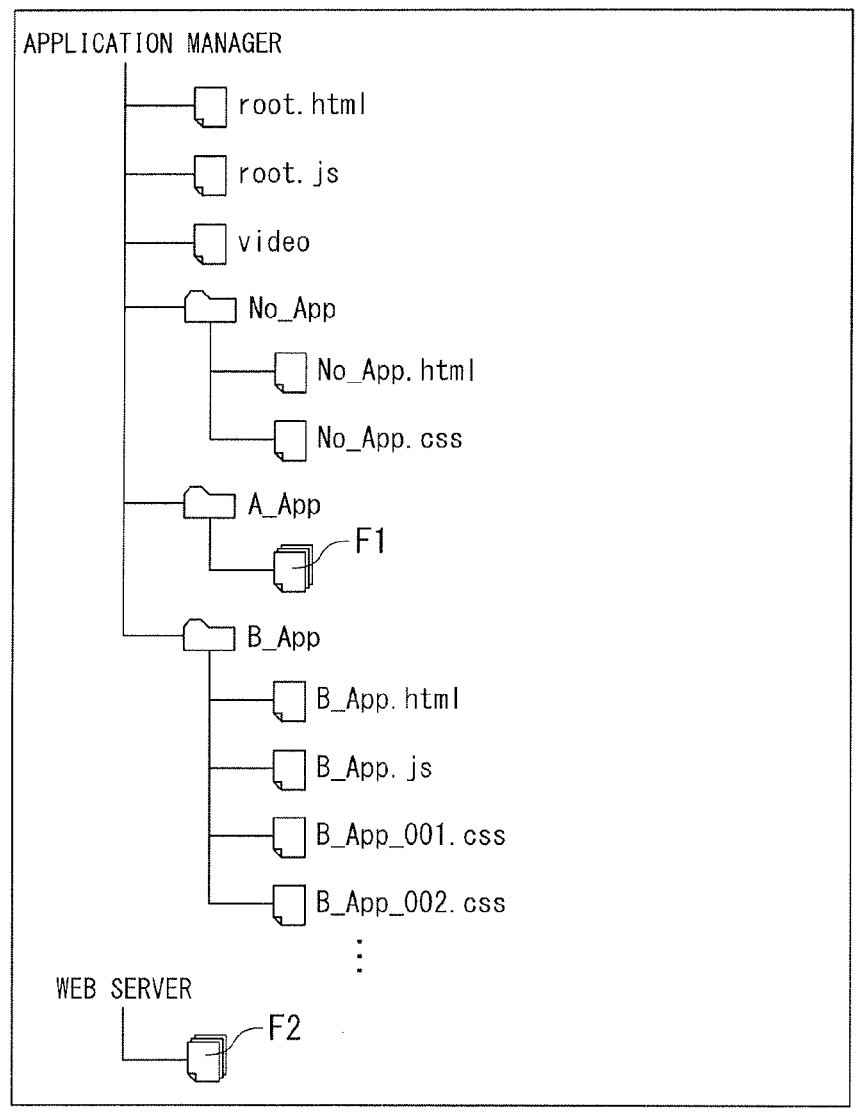
FIG. 2 is a directory structure diagram illustrating an example of information stored in an application manager unit and a web server unit.

FIG. 2 is a directory structure diagram illustrating an example of information stored in the application manager unit 22 and the web server unit 23.

The application manager unit 22 stores files root.html, root.js, and video (files for access of broadcast contents) in a root directory. Further, directories No_App, A_App, and B_App are provided under the root directory in the application manager unit 22.

root.html stored in the root directory is an HTML document in which a frame of information displayed on the display unit 40 is defined. Specifically, root.html includes only an iframe (in-line frame) element which causes display to be performed on a full screen, and causes the iframe element to reference another HTML document, such that display information including the application and the broadcast contents can be generated.

Further, root.js stored in the root directory is a script in which instructions executed in root.html are described. Specifically, an instruction to generate a notification of the policy level corresponding to the presentation control signal output by the tuner unit 10 to a reference destination of the iframe element in response to the presentation control signal (hereinafter referred to as a listenEvent instruction), and an instruction to cause the iframe element of root.html to reference an HTML document corresponding to an application to be executed (hereinafter referred to as changeHTML instruction) are described.

Further, the file video stored in the root directory is a file for accessing the broadcast contents acquired by the tuner unit 10. In other words, when display information is generated from the HTML document which references the file video, display information causing the broadcast contents to be displayed in a part corresponding to an element referencing the file video is generated.

The application manager unit 22 stores files No_App.html and No_App.css in the directory No_App.

No_App.html stored in the directory No_App is an HTML document caused to be referenced by iframe of root.html when there is no application to be executed. Specifically, No_App.html includes only a video element. Further, the video element references the file video of the root directory.

Further, No_App.css stored in the directory No_App is a style sheet file indicating a layout of components of No_App.html. Specifically, No_App.css defines a display position and a size to cause the video element of No_App.html to be displayed on the full screen.

The application manager unit 22 stores, in the directory A_App, a file F1 of application A received from the application server. The file F1 of application A includes an HTML document, a script caused to be referenced by the HTML document, a style sheet file indicating a layout of components of the HTML document, and the like. Further, a video element referencing the file video of the root directory, and other elements constituting the application are included in the HTML document of application A.

The application manager unit 22 stores B_App.html, B_App.js, and a plurality of style sheet files (B_App_001.css, B_App_002.css, etc.) in the directory B_App.

B_App.html stored in the directory B_App is an HTML document in which a frame in which application B and the broadcast contents are displayed when application B is executed is defined. Specifically, B_App.html includes an iframe element which references application B, and a video element which references the file video of the root directory.

Further, B_App.html is referenced by the iframe element of root.html when the application to be executed is application B.

Further, B_App.js stored in the directory B_App is a script in which instructions executed in the B_App.html are described. Specifically, an instruction to switch a style sheet file to be referenced (hereinafter referred to as a changeCSS instruction) according to a policy level of which root.html has notified, and a changeHTML instruction to cause the iframe element of B_App.html to reference the HTML document of the application B to be executed are described.

Further, a style sheet file (layout information) stored in the directory B_App is a style sheet file indicating a layout of components of B_App.html. Specifically, each style sheet file defines display positions and sizes of the iframe element and the video element of B_App.html.

Further, a numerical part of a name of each style sheet file is a value indicating the policy level. Specifically, B_App_001.css is a style sheet file corresponding to the policy level 001. Similarly, B_App_002.css is a style sheet file corresponding to the policy level 002. In other words, the application manager unit 22 stores the style sheet files in association with the policy levels.

The web server unit 23 stores a file F2 of application B received by the application manager unit 22. The file F2 of application B may include an HTML document, a script caused to be referenced by the HTML document, a style sheet file indicating a layout of components of the HTML document, and the like.

Further, the application manager unit 22 prohibits access to a local file through HTTP (HyperText Transfer Protocol). Therefore, application B can be prevented from fraudulently referencing the broadcast contents due to execution of application B in the browser unit 30. On the other hand, the application manager unit 22 permits the access to the local file through the File protocol which is protocol for access to the local file. Therefore, the reference to the broadcast contents due to execution of application A in the browser unit 30 is not disturbed.

Further, the request by HTTP is, for example, "http://localhost/html of application B." On the other hand, the request by the File protocol is, for example, "file:///root directory/A_App/A_App.html."

A configuration of the browser unit 30 will be described with reference to FIG. 1.

The browser unit 30 is a processing unit that executes the application to generate display information, and includes an HTML parser unit 31, a script execution unit 32, and a display information generation unit 33 (execution unit).

The HTML parser unit 31 parses root.html stored in the application manager unit 22. Further, when the parsed HTML document references the HTML document stored in the application manager unit 22 or the web server unit 23, the HTML parser unit 31 also parses the HTML document.

The script execution unit 32 executes a script referenced by the HTML document parsed by the HTML parser unit 31.

The display information generation unit 33 generates the display information to be displayed on the display unit 40 according to a parsing result of the HTML document from the HTML parser unit 31, a style sheet file referenced by the HTML document, and an execution result of the script execution unit 32.

The display unit 40 is implemented by a display such as an LCD (Liquid Crystal Display), and displays the display information generated by the display information generation unit 33.

Next, an operation of the receiver 100 according to this embodiment will be described.

Figure 3:
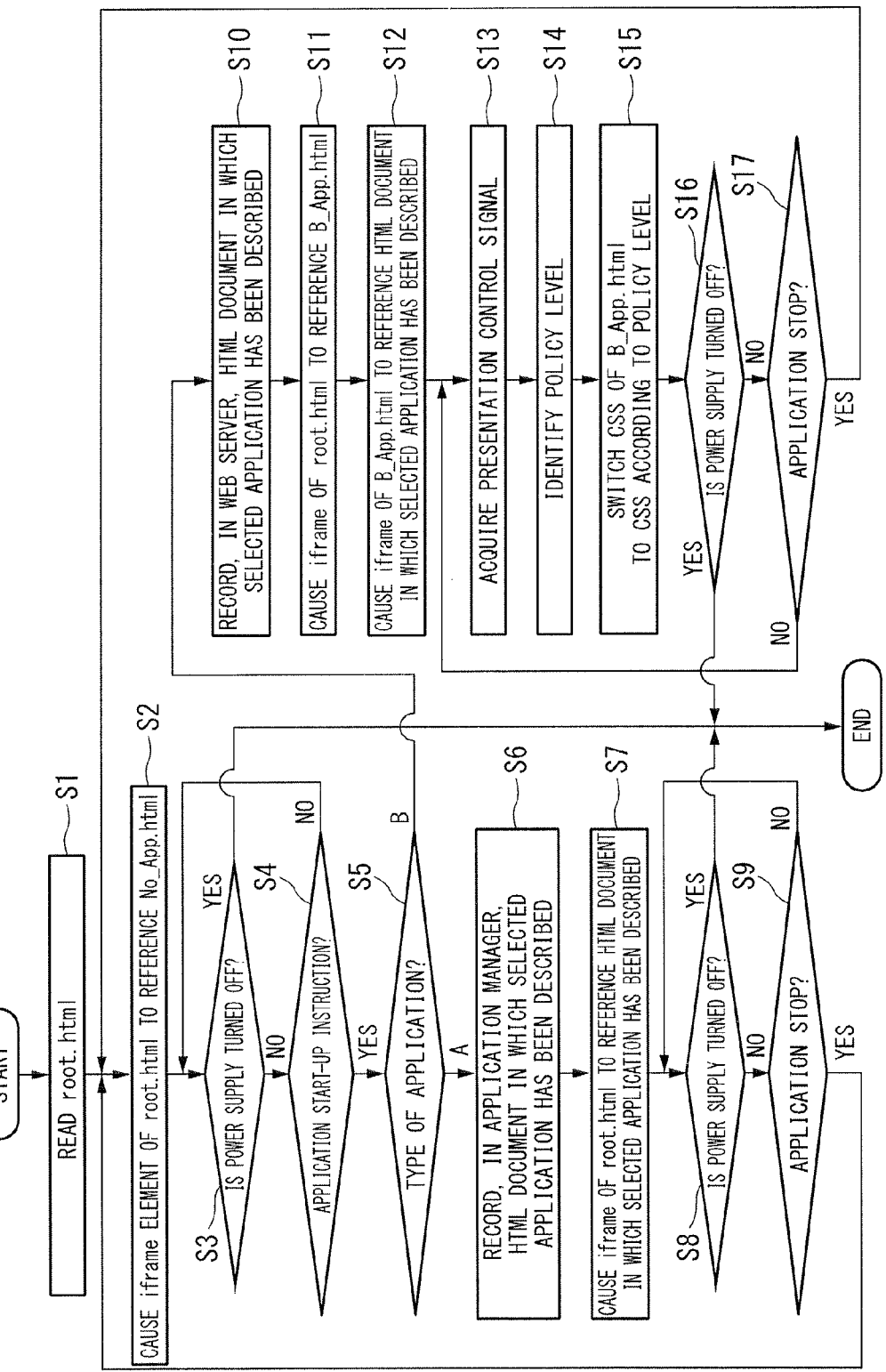
FIG. 3 is a flowchart illustrating an operation of a receiver according to this embodiment.

FIG. 3 is a flowchart illustrating an operation of the receiver 100 according to this embodiment.

When a power supply of the receiver 100 is turned ON, the HTML parser unit 31 reads root.html stored in the root directory from the application manager unit 22 and parses root.html (step S1). Then, when the HTML parser unit 31 identifies that root.js is referenced within root.html through parsing of root.html, the HTML parser unit 31 reads root.js stored in the root directory from the application manager unit 22, and outputs root.js to the script execution unit 32.

Then, the script execution unit 32 executes a changeHTML instruction to cause the iframe element of root.html to reference an HTML document corresponding to the application to be executed according to root.js. Further, since there is no application to be executed at a time point at which the power supply is turned on, the script execution unit 32 causes the iframe element of root.html to reference No_App.html. Accordingly, the HTML parser unit 31 reads No_App.html stored in the directory No_App from the application manager unit 22, and arranges No_App.html in the iframe element of root.html (step S2).

Then, the HTML parser unit 31 parses No_App.html. In this case, since the video element referencing the file video is included in No_App.html, the HTML parser unit 31 outputs a request of the file video to the resident unit 20. The application manager unit 22 of the resident unit 20 references protocol of the request. Since the protocol of the request is File protocol, the application manager unit 22 permits the reference to the file video. Also, the display information generation unit 33 generates display information based on the information parsed by the HTML parser unit 31. In this case, since the reference to the file video is permitted, the display information generation unit 33 generates display information causing the broadcast contents acquired from the broadcast contents acquisition unit 12 to be displayed in a part corresponding to the video element of No_App.html.

Also, the display unit 40 displays the display information generated by the display information generation unit 33.

Here, the receiver 100 determines whether an instruction to turn OFF the power supply from a remote controller has been received (step S3). When the receiver 100 receives the instruction to turn OFF a power supply (step S3: YES), the receiver 100 ends the process and turns OFF the power supply.

On the other hand, when the instruction to turn OFF a power supply has not been received (step S3: NO), the application manager unit 22 determines whether the application start-up instruction has been received from the AIT acquisition unit 14 or the application selection reception unit 21 (step S4). When the application manager unit 22 has determined that the application start-up instruction has not been received (step S5: NO), the application manager unit 22 repeatedly executes the determination of steps S3 and S4. In other words, only the broadcast contents are displayed on the display unit 40 until the application start-up instruction is received.

On the other hand, when the application manager unit 22 has determined that the application start-up instruction has been received (step S4: YES), the application manager unit 22 determines whether the application is application A or application B (step S5).

When the application manager unit 22 has determined that a type of application is application A (step S5: A), the application manager unit 22 receives the selected application from the application server and records the HTML document in which the application is described in the directory A_App of the application manager unit 22 (step S6). Then, the script execution unit 32 detects an event indicating that the application manager unit 22 has recorded application A and executes a changeHTML instruction to cause the iframe element of root.html to reference application A recorded by the application manager unit 22 according to root.js. Accordingly, the HTML parser unit 31 reads the HTML document in which the application is described, which has been stored in the directory A_App, from the application manager unit 22, and arranges the HTML document in the iframe element of root.html (step S7). Also, the display information generation unit 33 generates display information based on the information parsed by the HTML parser unit 31.

Then, the HTML parser unit 31 parses A_App.html. In this case, since the video element referencing the file video is included in A_App.html, the HTML parser unit 31 outputs a request of the file video to the resident unit 20. The application manager unit 22 of the resident unit 20 references protocol of the request. Since the protocol of the request is File protocol, the application manager unit 22 permits the reference to the file video. Also, the display information generation unit 33 generates display information based on the information parsed by the HTML parser unit 31. In this case, since the reference to the file video has been permitted, the display information generation unit 33 generates display information causing the broadcast contents acquired from the broadcast contents acquisition unit 12 to be displayed in a part corresponding to the video element of A_App.html.

Also, the display unit 40 displays the display information generated by the display information generation unit 33.

Here, the receiver 100 determines whether the instruction to turn OFF a power supply from a remote controller or the like has been received (step S8). When the receiver 100 has received the instruction to turn OFF a power supply (step S8: YES), the receiver 100 ends the process and turns OFF the power supply.

On the other hand, when the instruction to turn OFF a power supply has not been received (step S8: NO), the application manager unit 22 determines whether the application stop instruction has been received from the AIT acquisition unit 14 or the application selection reception unit 21 (step S9). When the application manager unit 22 has determined that the application stop instruction has not been received (step S9: NO), the application manager unit 22 repeatedly executes the determination of steps S8 and S9. In other words, application A including the broadcast contents is displayed on the display unit 40 until the application start-up instruction is received.

On the other hand, when the application manager unit 22 has determined that the application stop instruction has been received (step S9: YES), the script execution unit 32 executes a changeHTML instruction causing the iframe element of root.html to reference No_App.html and returns to step S2.

When the application manager unit 22 has determined that a type of application is application B in step S5 (step S5: B), the application manager unit 22 receives the selected application from the application server and records, in the web server unit 23, an HTML document in which the application is described (step S10). Then, the script execution unit 32 detects an event indicating that the application manager unit 22 has recorded application B, and executes a changeHTML instruction to cause the iframe element of root.html to reference B_App.html according to root.js. Accordingly, the HTML parser unit 31 reads B_App.html stored in the directory B_App from the application manager unit 22, and arranges B_App.html in the iframe element of root.html (step S11).

Then, the HTML parser unit 31 parses B_App.html. In this case, since the video element referencing the file video is included in B_App.html, the HTML parser unit 31 outputs a request for the file video to the resident unit 20. The application manager unit 22 of the resident unit 20 references protocol of the request. Since the protocol of the request indicates File protocol, the application manager unit 22 permits the reference to the file video.

Then, when the HTML parser unit 31 identifies that B_App.js is referenced within B_App.html through parsing of B_App.html, the HTML parser unit 31 reads B_App.js stored in the directory B_App from the application manager unit 22 and outputs B_App.js to the script execution unit 32.

Then, the script execution unit 32 executes a changeHTML instruction causing the iframe element of B_App.html to reference the HTML document in which the application recorded in the web server unit 23 in step S10 is described according to B_App.js. Accordingly, the HTML parser unit 31 reads the HTML document in which the selected application is described from the web server unit 23, and arranges the HTML document in the iframe element of B_App.html (step S12).

Then, the HTML parser unit 31 parses the HTML document arranged in the iframe element of B_App.html. When the video element referencing the file video is included in the HTML document, the HTML parser unit 31 outputs a request of the file video to the resident unit 20. The application manager unit 22 of the resident unit 20 references the protocol of the request. Since the protocol of the request is HTTP, the application manager unit 22 refuses the reference to the file video.

Then, the script execution unit 32 acquires the presentation control signal from the presentation control signal acquisition unit 13 (step S13). Further, the presentation control signal acquisition unit 13, for example, may acquire a plurality of presentation control signals, such as presentation control signals from EIT and EEW, at the same time. Then, the script execution unit 32 identifies the policy level indicated by the presentation control signal through execution of a listenEvent instruction described in root.js (step S14). In this case, when the presentation control signal acquisition unit 13 acquires the plurality of presentation control signals, the presentation control signal acquisition unit 13 identifies the policy levels according to a priority shown below. Further, the priority is assumed to be, for example, SDT, EIT, PMT, and EEW/EWS sequentially in ascending order. Accordingly, the script execution unit 32 may identify the policy level indicated by the presentation control signal having a highest urgency as the policy level used for presentation control.

Then, the script execution unit 32 notifies B_App.html referenced by the iframe element of root.html of the identified policy level. Accordingly, the script execution unit 32 executes a changeCSS instruction identifying a style sheet file corresponding to the policy level according to B_App.js referenced by B_App.html, and the HTML parser unit 31 reads the style sheet file from the application manager unit 22. In other words, when the policy level identified in step S14 is 001, the HTML parser unit 31 reads B_App__001.css stored in the directory B_App from the application manager unit 22. Accordingly, the HTML parser unit 31 switches the style sheet file applied to B_App.html to the style sheet file according to the policy level (step S15).

Also, the display information generation unit 33 generates display information based on the information parsed by the HTML parser unit 31 and the style sheet file read by the HTML parser unit 31.

The display information generation unit 33 generates display information causing the broadcast contents acquired from the broadcast contents acquisition unit 12 to be displayed in a part corresponding to the video element of B_App.html whose reference to the file video has been permitted. On the other hand, since the reference to the file video has been refused for the HTML document referenced by the iframe element of B_App.html, the broadcast contents are not displayed in the part corresponding to the video element.

Also, the display unit 40 displays the display information generated by the display information generation unit 33.

Here, the receiver 100 determines whether an instruction to turn OFF a power supply from a remote controller or the like has been received (step S16). When the receiver 100 has received the instruction to turn OFF a power supply (step S16: YES), the receiver 100 ends the process and turns OFF the power supply.

On the other hand, when the receiver 100 has not received the instruction to turn OFF a power supply (step S16: NO), the application manager unit 22 determines whether an application stop instruction has been received from the AIT acquisition unit 14 or the application selection reception unit 21 (step S17). When the application manager unit 22 has determined that the application stop instruction has not been received (step S17: NO), the application manager unit 22 returns to step S13. In other words, the broadcast contents and application B are displayed on the display unit 40 until an application start-up instruction is received, and the layout changes according to the policy level indicated by the presentation control signal.

On the other hand, when the application manager unit 22 has determined that the application stop instruction has been received (step S17: YES), the script execution unit 32 executes a changeHTML instruction to cause the iframe element of root.html to reference No_App.html, and returns to step S2.

Then, the above-described operation is repeatedly executed until the power supply of the receiver 100 is turned OFF.

Thus, according to this embodiment, the application manager unit 22 records, in the application manager unit 22, the application whose reference to the contents has been determined to have been permitted. On the other hand, the application manager unit 22 records, in the web server unit 23, an application whose reference to the contents has been determined not to have been permitted. Also, the application manager unit 22 refuses the reference to the broadcast contents due to execution of an application other than the application recorded in the application manager unit 22.

Specifically, the application manager unit 22 stores the file video accessing the contents acquired by the broadcast contents acquisition unit 12, and refuses the reference to the file video due to the execution of the application other than the application recorded in the application manager unit 22.

Accordingly, it is possible to control the access to the contents included in the broadcast signal, without depending on the API.

While one embodiment of the present invention has been described in detail with reference to the drawings, a concrete configuration is not limited to the foregoing and various design changes may be performed without departing from the gist of the present invention.

For example, while the case in which No_App.html including only the video element is displayed when the application is not executed has been described in this embodiment, the present invention is not limited thereto. For example, when the application does not start up and when the application manager unit 22 has received the application stop instruction, the display unit 40 may directly display the contents acquired by the broadcast contents acquisition unit 12 on the display unit 40.

Further, while the case in which the presentation control signal is monitored only at the time of execution of application B has been described in this embodiment, the present invention is not limited thereto. For example, each application A references a script which switches a style sheet file, such that the layout can be switched, as in the execution of application B.

Further, while the case in which the style sheet file is used as layout information has been described in this embodiment, the present invention is not limited thereto and, for example, an HTML document may be used as the layout information. In this case, the application manager unit 22 stores a plurality of HTML documents which define a layout corresponding to the policy level, and the script execution unit 32 switches an HTML document loaded to the HTML parser unit 31 according to the policy level.

Further, the style sheet file and the HTML document may both be used as the layout information. For example, only the style sheet file may be switched in the case of the policy level 001, and both the style sheet file and the HTML document may be switched in the case of the policy level 002.

Further, while the case in which the application manager unit 22 determines whether the file video can be referenced based on whether the protocol is HTTP or File protocol has been described in this embodiment, the present invention is not limited thereto. For example, the application manager unit 22 may determine whether the file video can be referenced based on the referrer of the request.

For example, in another embodiment, at least the file video among the files stored in the application manager unit 22 is set to be able to be referenced from only the file under the root directory of the application manager unit 22. For example, this can be realized by performing setting to permit the access to the file video for the application manager unit 22 only when the referrer of the HTTP access indicates the file of the application manager unit 22. With this setting, the application manager unit 22 refuses the reference to the file video due to execution of an application other than the application stored in the application manager unit 22, as in the embodiment described above. Accordingly, it is possible to prevent the broadcast contents from being fraudulently referenced by application B.

Further, the present invention is not limited to the file video, and the setting may be performed to refuse the reference to all files stored in the application manager unit 22 by a file other than the files stored in the application manager unit 22. Accordingly, it is possible to prevent application A from being fraudulently referenced by application B, in addition to prevention of fraudulent reference to the broadcast contents by application B.

Further, while the case in which application A and the file video are recorded in the application manager unit 22 and application B is recorded in the web server unit 23 has been described in the other embodiment, the present invention is not limited thereto. For example, application A and the file video may be recorded in a first directory (a first storage area) under the root directory of the web server unit 23, and application B may be recorded in a second directory (a second storage area) under the root directory of the web server unit 23. In this case, at least reference to the file video from the file under the second directory of the web server unit 23 is set to be refused.

The above-described receiver 100 includes a computer system provided therein. Also, the above process is performed by the operation of each processing unit described above being stored in a computer-readable recording medium in the form of a program and this program being read and executed by the computer system. Here, the computer-readable recording medium refers to a magnetic disk, a magnetic optical disc, a CD-ROM, a DVD-ROM, a semiconductor memory, or the like. Further, this computer program may be distributed to a computer using a communication line, and the computer receiving the distribution may execute the program.

Further, the above program may be intended to realize some of the above-described functions.

Further, the program may be a program capable of realizing the above-described functions in combination with a program previously stored in the computer system, i.e., a so-called differential file (a differential program).

INDUSTRIAL APPLICABILITY

The present invention is applicable to a receiver, a program, and a reception method which control the access to the contents included in the broadcast signal, without depending on the API.

REFERENCE SYMBOLS

10 . . . tuner unit
11 . . . tuning unit
12 . . . broadcast contents acquisition unit
13 . . . presentation control signal acquisition unit
14 . . . AIT acquisition unit
20 . . . resident unit
21 . . . application selection reception unit
22 . . . application manager unit
23 . . . web server unit
30 . . . browser unit
31 . . . HTML parser unit (execution unit)
32 . . . script execution unit
33 . . . display information generation unit
40 . . . display unit
100 . . . receiver
221 . . . determination unit
222 . . . recording unit
223 . . . reference refusal unit
224 . . . first storage area
231 . . . second storage area

The invention claimed is:

1. A receiver comprising:
a broadcast contents acquisition unit configured to acquire contents from a broadcast signal;
a determination unit configured to determine whether a received application is an application whose reference to the contents has been permitted;
a recording unit configured to record, in a first storage area, an application whose reference to the contents has been determined to have been permitted by the determination unit, and record, in a second storage area, an application whose reference to the contents has been determined not to have been permitted by the determination unit, the second storage area being different from the first storage area;
an execution unit configured to execute the application recorded in at least one of the first storage area and the second storage area;
a reference refusal unit configured to refuse reference to the contents acquired by the broadcast contents acquisition unit due to execution of an application other than the application recorded in the first storage area;

a presentation control signal acquisition unit configured to receive at least one presentation control signal for controlling a presentation method of the received application, wherein the determination unit is configured to determine that the received application is an application whose reference to the contents has been permitted, in a case that the received application is not a target of a screen presentation control by the at least one presentation control signal received by the presentation control signal acquisition unit, and the determination unit is configured to determine that the received application is an application whose reference to the contents has not been permitted, in a case that the received application is the target of the screen presentation control by the at least one presentation control signal received by the presentation control signal acquisition unit.

2. The receiver according to claim 1, wherein the recording unit stores an access file accessing the contents acquired by the broadcast contents acquisition unit in the first storage area, and the reference refusal unit is configured to refuse reference to the access file due to the execution of the application other than the application recorded in the first storage area.

3. The receiver according to claim 1, wherein the reference refusal unit is configured to permit the reference to the contents acquired by the broadcast contents acquisition unit due to execution of an application recorded in the first storage area.

4. The receiver according to claim 1, wherein in a case that the presentation control signal acquisition unit receives, as the at least one presentation signal, a plurality of presentation control signals, the determination unit is configured to determine whether the received application is the application whose reference to the contents has been permitted, the determination being performed by using a presentation control signal having a highest policy level, the presentation control signal being among the plurality of presentation control signals.

5. A non-transitory computer-readable recording medium storing a program for causing a computer of a receiver, when the program is executed on the computer, to function as:

a broadcast contents acquisition unit configured to acquire contents from a broadcast signal;

a determination unit configured to determine whether a received application is an application whose reference to the contents has been permitted;

a recording unit configured to record an application whose reference to the contents has been determined to have been permitted by the determination unit in a first storage area which stores an access file accessing the contents acquired by the broadcast contents acquisition unit, and record an application whose reference to the contents has been determined not to have been permitted by the determination unit in a second storage area which does not store the access file, the second storage area being different from the first storage area;

an execution unit configured to execute the application recorded in the first storage area or the second storage area;

a reference refusal unit configured to refuse reference to the access file due to execution of an application other than the application recorded in the first storage area;

a presentation control signal acquisition unit configured to receive at least one presentation control signal for controlling a presentation method of the received application, wherein the program causes the determination unit to determine that the received application is an application whose reference to the contents has been permitted, in a case that the received application is not a target of a screen presentation control by the at least one presentation control signal received by the presentation control signal acquisition unit, and the program causes the determination unit to determine that the received application is an application whose reference to the contents has not been permitted, in a case that the received application is the target of the screen presentation control by the at least one presentation control signal received by the presentation control signal acquisition unit.

6. The non-transitory computer-readable recording medium according to claim 5, wherein the program causes the reference refusal unit to permit the reference to the contents acquired by the broadcast contents acquisition unit due to execution of an application recorded in the first storage area.

7. The non-transitory computer-readable recording medium according to claim 5, wherein in a case that the presentation control signal acquisition unit receives, as the at least one presentation signal, a plurality of presentation control signals, the program causes the determination unit to determine whether the received application is the application whose reference to the contents has been permitted, the determination being performed by using a presentation control signal having a highest policy level, the presentation control signal being among the plurality of presentation control signals.

8. A reception method comprising:

acquiring contents from a broadcast signal;

determining whether a received application is an application whose reference to the contents has been permitted;

recording, in a first storage area, an application whose reference to the contents has been determined to have been permitted, and recording, in a second storage area, an application whose reference to the contents has been determined not to have been permitted;

executing the application recorded in the first storage area or the second storage area;

refusing reference to the contents due to execution of an application other than the application recorded in the first storage area;

receiving at least one presentation control signal for controlling a presentation method of the received application, wherein the determination that the received application is an application whose reference to the contents has been permitted is performed, in a case that the received application is not a target of a screen presentation control by the at least one presentation control signal received, and the determination that the received application is an application whose reference to the contents has not been permitted is performed, in a case that the received application is the target of the screen presentation control by the at least one presentation control signal received.

9. The reception method according to claim 8, wherein the reference to the acquired contents due to execution of an application recorded in the first storage area is permitted.

10. The reception method according to claim 8, wherein in a case that the presentation control signal acquisition unit receives, as the at least one presentation signal, a plurality of presentation control signals, the determination whether the received application is the application whose reference to the contents has been permitted is performed by using a presentation control signal having a highest policy level, the presentation control signal being among the plurality of presentation control signals.

* * * * *